RECORD CHANGER MECHANISM

Filed May 23, 1960 3 Sheets-Sheet 1

INVENTORS
Howard C. Grossenheider
Richard A. Hathaway
By Francis [signature] Atty.

RECORD CHANGER MECHANISM

Filed May 23, 1960 3 Sheets-Sheet 2

INVENTORS
Howard C. Grossenheider
Richard A. Hathaway
By Francis W. Crotty
Atty.

RECORD CHANGER MECHANISM

Filed May 23, 1960 3 Sheets-Sheet 3

INVENTORS
Howard C. Grossenheider
Richard A. Hathaway
By Francis W. Crotty
Atty.

3,240,498

RECORD CHANGER MECHANISM

Howard C. Grossenheider, Deerfield, and Richard A. Hathaway, Des Plaines, Ill., assignors to Zenith Radio Corporation, a corporation of Delaware Filed May 23, 1960, Ser. No. 30,893
10 Claims. (Cl. 274—10)

The present invention relates, in general, to a record-changer mechanism and is especially directed to an entertainment instrument for the home which may include a television receiver, an AM/FM radio receiver and a record changer. Preferably, the instrument is arranged for remote actuation both with respect to controlling functions of any of its component parts and with respect to selection as between its three principal portions. Since the subject invention concerns particularly the problem that arises in remotely controlling the device to switch from the record changer to the television or to the AM/FM receiver, the detailed description will be confined to only so much of the composite device as is necessary for an understanding of the problem and its solution.

In the use of such a composite instrument, one may decide to change from the operation of the phonograph or record changer to radio or television reception. The decision to make this change may, of course, occur when the record changer is only partially through its play of a number of records stored in the magazine customarily associated with the phonograph. It is a simple matter to arrange a selector which will effectively disable the record changer and, at the same time, turn on the receiver that is to be used but this is only part of the job. It is very desirable that, in turning off the phonograph, the tone arm be restored to its pedestal and the pulley which drives the turntable be removed from engagement with the turntable to avoid the development of a flat on the pulley surface. One will recognize that these are the conditions established as the record changer, following the play of the last record of its magazine, accomplishes automatic shut-off. The present invention concerns itself with simulating this condition and also the obviating of a phenomenon which has come to be known as the "lost record."

The peculiarities of the "lost record" condition arise from the fact that automatic shut-off occurs at the conclusion of the record-change cycle that follows immediately upon the playing of the last record that had previously been stored in the magazine section of the changer. In the ordinary case, since all of the records have been dispensed from the magazine, the execution of a record-change cycle to accomplish shut-off does not result in the feeding of a record to the turntable but, if shut-off is to be obtained by simulating this condition, a much different circumstance presents itself. Specifically, to shut the instrument off it is still necessary to effect a record-change cycle but since this may be initiated before all of the records have been dispensed from the magazine, a record is dropped or fed to the turntable as an incident to the shut-off. It is this record that is referred to by the expression the "lost-record" and it is this unwanted record feed that is obviated by the arrangement to be described herein.

Accordingly, it is an object of the invention to provide a record-changing mechanism in which shut-off may be accomplished from a remote point prior to the play of the last record stored in the magazine.

It is a further object of the inventioin to provide in a record changer which exhibits such a shut-off capability an improvement for precluding the lost record effect.

The record changer to be described herein has a cycling mechanism and a record-feed mechanism actuated by the cycling device for feeding records from a magazine into playing position. There is a shut-off mechanism, responsive to the operation of the cycling mechanism following the play of the last record in the magazine, for shutting off the changer. Additionally, there are means for simulating in the changer an operating condition which is characteristic of the play of the last record to effect shut-off of the changer in the cycle which next succeeds the simulated condition of playing the last record. In accordance with a salient feature of the invention there are further included in the changer means responsive to the aforementioned simulating means for disabling the record-feed mechanism in the cycling of the change mechanism which succeeds the simulated operating condition as aforedescribed.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 2:
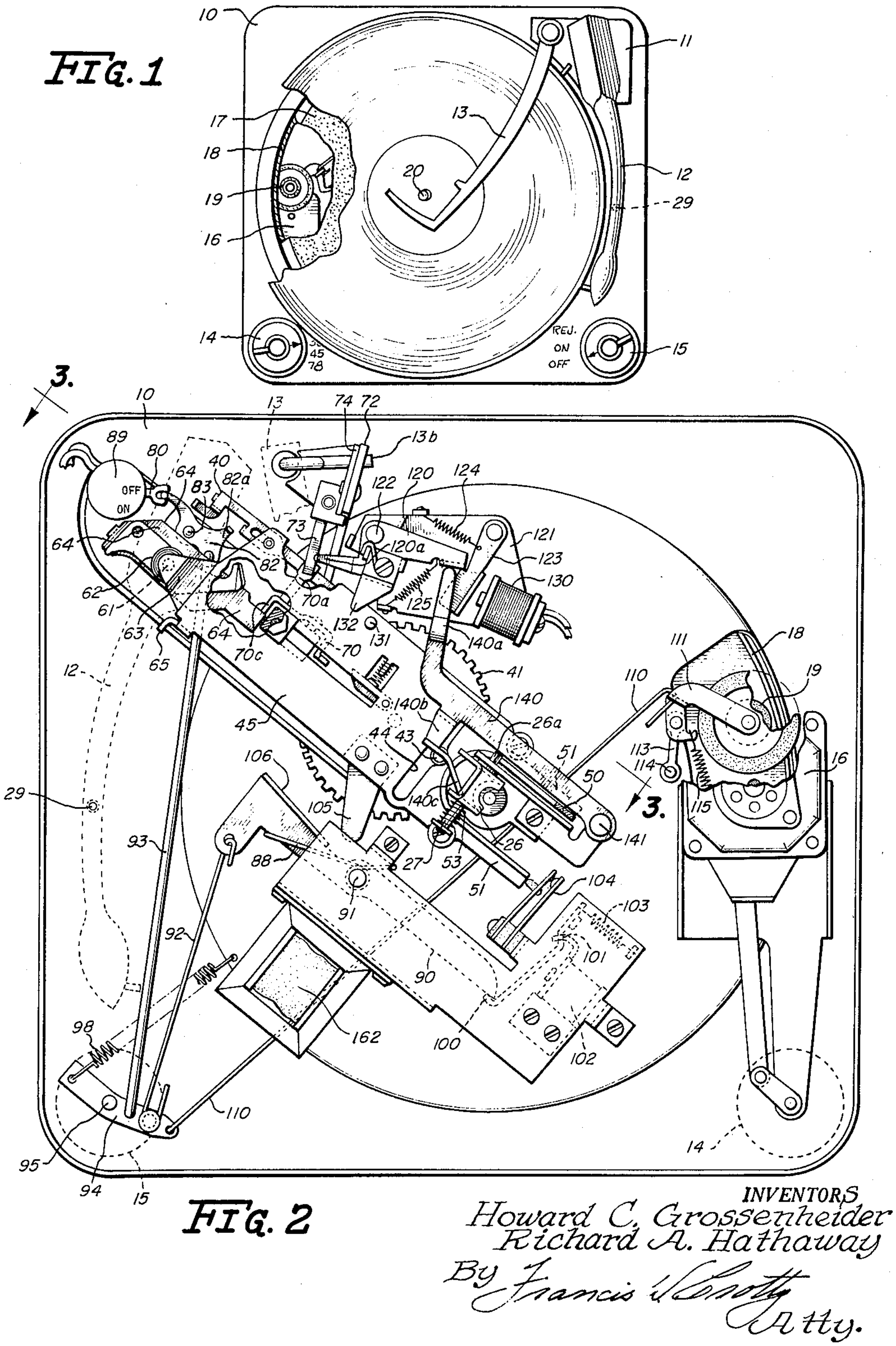
FIGURE 1 is a plan view, partially broken away, of an automatic record changer including a simulated shut-off and lost-record-obviating mechanism constructed in accordance with the invention.
FIGURE 2 shows a portion of the record changer viewed from underneath.
Figures 2A, 5:
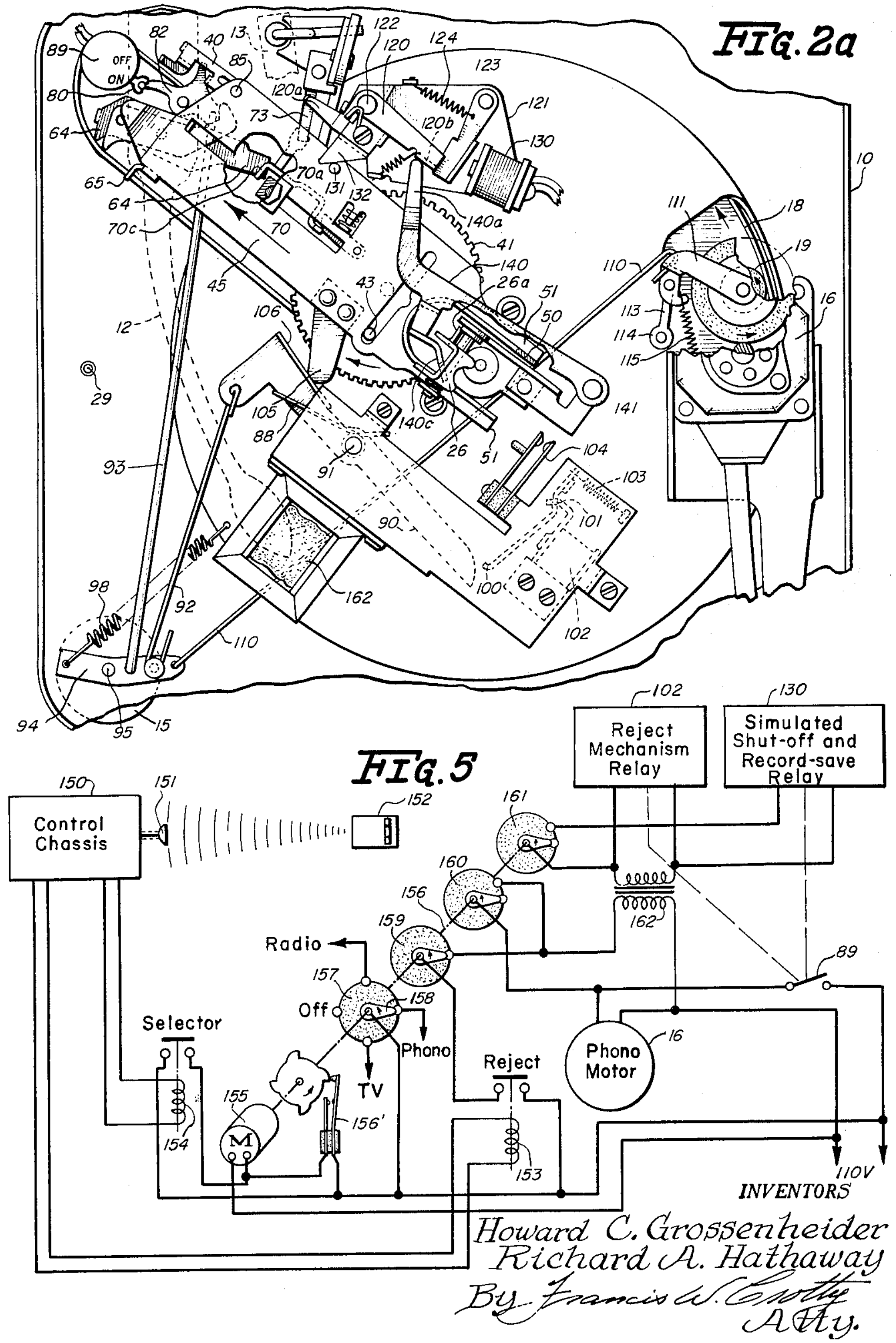
Figures 3, 4A, 4B:
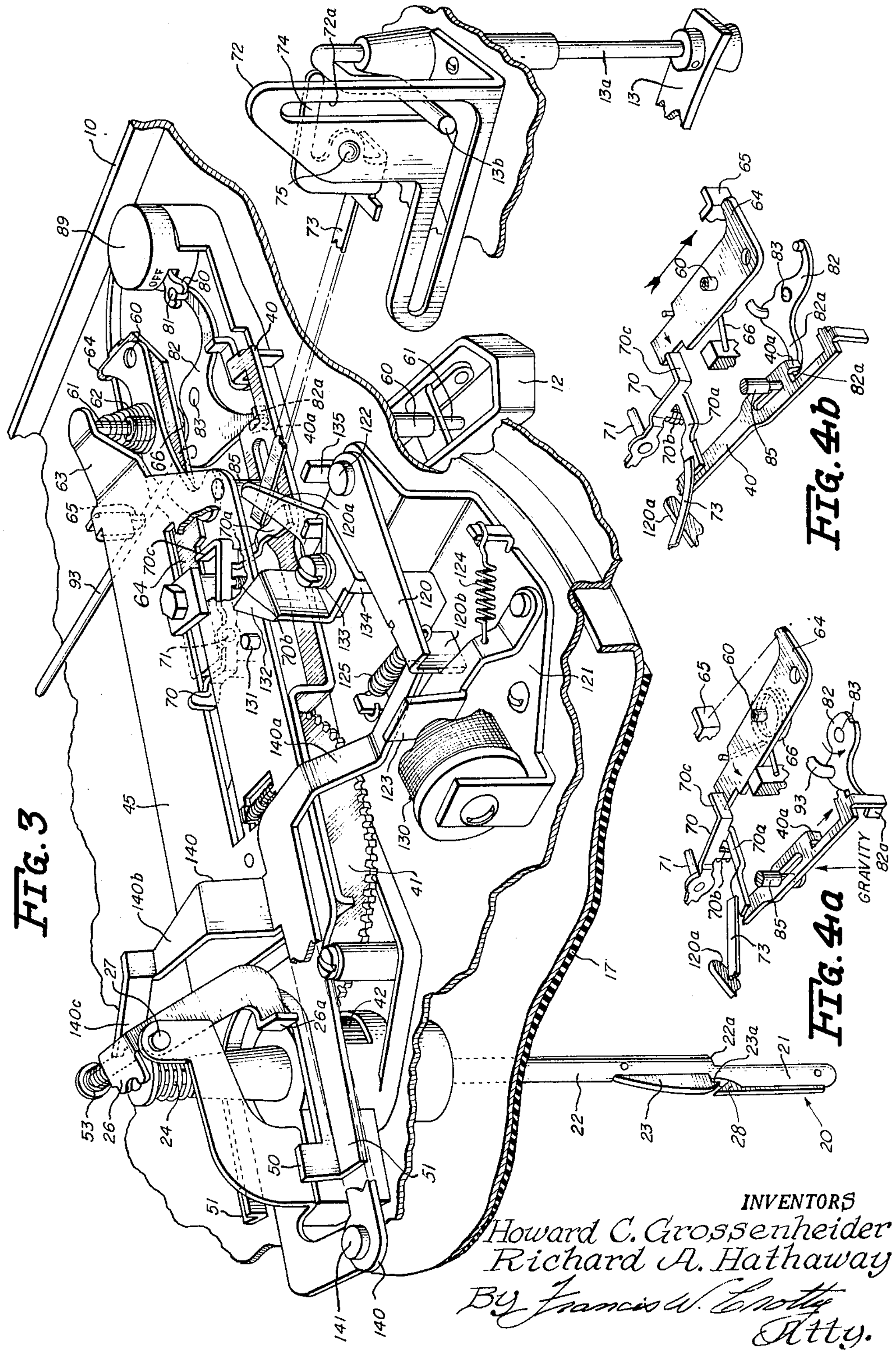

FIGURE 2*a* is similar to the view of FIGURE 2 but indicates a different operating condition of the apparatus;

FIGURE 3 is an enlarged view of a portion of the structure of FIGURE 2;

FIGURES 4*a* and 4*b* are further fragmentary views used in explaining the operation of the structure; and FIGURE 5 is a schematic representation of a control circuit of the system for operating the record changer from a remote point.

The phonograph mechanism represented in the drawings has a number of functions that may be accomplished by the operation of a remote control system, including on/off, record reject and shut-off. The portions of the structure relied upon for the on/off and record reject functions are described in detail and are claimed in a copending application, Serial No. 11,883, filed February 29, 1960 in the name of Ralph W. Galke et al. and assigned to the assignee of the present invention and now Patent No. 3,038,728. The shut-off and lost-record-prevention features are, in effect, further improvements of the basic remotely controlled record changed of the Galke et al. application.

Aside from those components of the record changer which have been added for the purpose of remote control of the several functions enumerated, the apparatus is entirely conventional and therefore the description will be restricted to the details of those sections that have to do with the remotely controlled functions. Actually, the mechanism, aside from the remotely controlled features, is a commercially availabe changer, type No. 1241, market by VM Corporation, Benton Harbor, Michigan.

*General description*

The record changer has a base 10 on which are located a mounting structure 11 for a tone arm 12 and a pressure-arm assembly 13. It also accommodates the usual manual adjustments including a speed control 14 and an on/off reject knob 15. Base 10 is also the principal support of the operating mechanism of the instrument including a driving motor 16 which appears through the broken-away section of turntable 17 in FIGURE 1. As usual, the turntable has a depending flange 18 which may be engaged by a drive pulley 19 to effect rotation thereof. The mechanical drive between motor 16 and pulley 19 generally includes a family of pulleys of different diameters or other structure for selectively driving the turntable at any one of a plurality of rotational speeds even though the driving motor is a constant speed device. Selection of the available operating speds is by means of manually adjustable knob 14 and in the usual case rotational speeds of 16, 33, 45 and 78 revolutions per minute are available.

A center drop spindle 20 is positioned at the center or axis of rotation of the turntable, being disposed vertically to serve as a magazine or storage facility for a group of records having center apertures which correspond in diameter to the spindle. In addition to serving as a record storing magazine, the spindle functions under the control of a record-change cycling mechanism to be considered more particularly hereinafter to feed records one after the other from the magazine into playing position on the turntable. The structure of such a spindle is well understood in the art and therefore has not been shown in detail although the principal components are more clearly visible in FIGURE 3. The free end 21 of the spindle is offset relative to its principal portion 22, the offset therebetween defining a shoulder **22*a* against which a stack of records which is threaded over section 21 may rest. A spring-biased ejector 23, shown in its quiescent position, is pivotally mounted in the main spindle section 22 and vertically displaceable in such relation therein to a position which permits an associated ejector finger 23*a* to project into the centering aperture of the lowermost record of the stack accommodated by spindle section 21. Pivotal movement of ejector 23 during a record-change cycle displaces the lowermost record from shoulder 22*a* in order that it may descend spindle section 22 to the turntable. Pivotal movement of ejector 23 is accomplished by an actuating rod 24 which extends upwardly into spindle section 22 but which is normally urged downwardly by the biasing spring (not shown) for ejector 23. An operator 26 pivotally supported on a stub shaft 27 may be deflected in a counter-clockwise direction about shaft 27, as viewed in FIGURE 3, to elevate rod 24 and pivot ejector 23. This displacement of member 26 is under the control of the record-change cycling mechanism that will be considered hereinafter. Suffice it for now to say that once in the change cycle, except for a simulated shut-off condition that will be considered in detail subsequently, member 26 is displaced to actuate plunger 24 and cause ejector 23 to feed a single record from the magazine. A blade 28 slidably supported within the terminating section 21** of the spindle accomplishes a hold-back function so that in any record-changing cycle only one record may be fed to the turntable at a time.

Returning to a consideration of the changer as viewed in FIGURE 1, pressure-arm assembly 13 serves as a stabilizer to retain the records stored in the magazine section of spindle 20 in a desired horizontal position. Obviously, as records are paid out of the magazine, pressure arm 13 descends in step by step fashion until the discharge of the final record from the magazine permits the pressure arm to descend to a lower limit. This final movement of the pressure arm is employed to initiate an automatic shut-off function following the play of the last record in a manner well understood in the art. Some consideration will be given to the mechanics of accomplishing this function hereinafter because the simulated shut-off condition referred to above is intimately associated therewith.

Tone arm 12 carries a stylus at its free end and is controlled by the record-change cycling mechanism to set down at the leading edge of a record, track the record throughout the entire program recorded thereon and then, by coursing a groove which has a distinctly different pitch from that of the program grooves, actuate the record-change cycling mechanism to initiate a cycle of operations in which the tone arm is first lifted from its tracking engagement of the record which has been played and then moved to a rest position indicated in FIGURE 1. In this position, the tone arm is clear of the path of a descending record so that the ejecting mechanism of the spindle may feed the next record from the magazine onto the turntable. When this has been accomplished the tone arm is returned to the leading portion of the program groove of the record that is now positioned on the turntable in order that it may be played in a repetition of the same general cycle of operations. The mechanical movements for this control of tone arm 12 are well understood in the art and since they themselves do not constitute any part of the present invention, they will not be described in complete detail.

The art also well understands that a record changer having an automatic shut-off feature modifies the described cycle of the tone arm in the operation of the record-change cycling mechanism which follows upon the play of the last record stored in the magazine. In that particular cycle, the return of the tone arm from the position in which it is completely clear of the path of descending records is restricted so that the tone arm remains in alignment over a pedestal or resting post 29. Thereafter, the mechanical motion which lowers the tone arm at the conclusion of the record-change cycle causes the tone arm to set down on the pedestal in its stored or at rest position.

The record-change cycling mechanism is likewise a conventional and known structure which drives the several major components of the record changer as required to achieve the automatic play of a series of records stacked on the magazine portion of center drop spindle 20. While the entire detail of the change-cycling mechanism has not been illustrated and will not be described, those portions which are significant in respect of the functions of the record reject, simulated shutoff, and lost record prevention have been illustrated and will be dealt with to a degree sufficient to afford an understanding of the accomplishment of these several functions.

*Change-cycle mechanism*

Referring now to FIGURE 2, the change-cycle mechanism includes a trip lever 40 which may be moved in the direction of its own length to initiate a record-change cycle. That cycle is driven from a one-cycle mutilated gear 41 which normally stops with its mutilated section facing a continuously rotating driving pinion 42 affixed to turntable 17. This pinion appears in FIGURE 3 but is obscured by other components in the view of FIGURE 2. Gear 42 is continuously driven by virtue of the frictional engagement between motor driven pulley 19 and flange 18 of the turntable. A mechanical driving connection may be effected between pinion 42 and mutilated gear 41 by displacement of trip lever 40 generally to the left, as viewed in FIGURE 2, to introduce a movable tooth (not shown but captivated upon gear 41) into the mutilation of gear 41. Upon interception by pinion 42, this tooth displaces gear 41 in a clockwise direction to complete a driving connection between gear 41 and pinion 42. An eccentric pin 43 mounted off-center on one face of gear 41 is received in a slot 44 in a reciprocating carriage 45 so that carriage 45 executes one oscillation during a single revolution of gear 41.

*Record-feed drive*

The drive connection from carriage 45 to the record-feed mechanism is provided by a vertically extending projection 50 of a bifurcated termination 51 of carriage 45. While these parts are visible in FIGURE 2 they are more clearly shown in the enlarged view of FIGURE 3. As shown in FIGURES 2 and 3, projection 50 is at one end of its travel and, in moving to its other extreme position as carriage 45 oscillates, it engages a termination 26a of pivot lever 26. It is clear in FIGURE 2 that lever 26 is a generally U-shaped saddle pivotally supported on shaft 27 and urged by a spring 53 in such direction as to maintain its termination 26a across the path of travel of carriage projection 50.

*Tone-arm positioning and automatic shut-off*

The interconnection of carriage 45 with the tone-arm assembly required to oscillate the tone arm about a vertical axis is also shown in FIGURES 2 and 3, especially the latter. The tone arm is supported from a post 60 which is rotatable in respect of supporting plate 10 of the phonograph structure. Shaft 60 is hollow and a plunger 61 extends therethrough into the region immediately adjacent the undersurface of the horizontal portion of the tone arm housing. Plunger 61 is retained by a spring 62 out of engagement with the tone arm but it may be urged toward the tone arm by means of a cam surface 63 of carriage 45. When this plunger is displaced, the tone arm is elevated or lifted from the record and as the cam surface recedes, the tone arm is permitted to return to its lowest position under the influence of spring 62. Rotational displacement of the tone arm is accomplished by a lever 64 secured to shaft 60 in a position to be engaged by an extension 65 of carriage 45 as the carriage executes a cycle of oscillation. During the forward motion of the carriage, displacement to the right as viewed in FIGURE 3, projection 65 engages lever 64 to rotate shaft 60 and tone arm 12 clockwise to move the tone arm clear of turntable 17 and from the path of descent of a record to be fed to the turntable. The return movement of carriage 45 permits a spring 66, which does not appear clearly in FIGURE 3 but which is indicated in FIGURES 4a and 4b, to return lever 64, shaft 60 and tone arm 12 to the extent permitted by positioning-control lever 70 which is pivoted on a pin 71. Lever 70 may have a stepped portion so that the return of lever 64 may be selectively controlled as required to accommodate 7, 10 or 12 inch records but since that is of no particular concern to the present invention, it has not been shown and will not be considered further.

The tone-arm positioning lever 70 obviously has a role to play in the accomplishment of automatic shut-off because when the changer is to be shut-off the return of tone arm 12 is to be so confined that the descent of the tone arm at the conclusion of the particular record-change cycle positions the tone arm at rest on its pedestal 29. A depending section 13a of the pressure-arm assembly appears clearly in FIGURE 3 where it is seen that this portion has a generally L-shaped termination with a finger 13b traversing the vertical slot 72a of a bracket 72. A pivoted lever 73 shaped similarly to a bell crank has a portion 74 disposed across the path of finger 13b of the pressure-arm assembly to be displaced about a pivot pin 75 when pressure arm 13, after the last record has been fed from the magazine section of center drop spindle 20, descends to its lowermost position thereby permitting its finger 13b to contact portion 74 of the bell crank. The other arm of the bell crank overlies an extension 70a of tone-arm positioning lever 70 which is illustrated most clearly in the fragmentary views of FIGURES 4a and 4b.

During operating intervals in which bell crank 73 is not engaged by finger 13b, it is retained by its own weight in the position of FIGURE 4a in which it is clear of control-lever member 70a. For this condition, a spring 70b, which tends normally to bias lever 70 counter-clockwise in respect of its pivot pin 71, positions the termination of lever 70 above and clear of lever 64. Therefore, the return movement of lever 64 is not impeded in any way by the stop portion 70c of the tone arm position-control lever. After the play of the last record, when the pressure-arm assembly has displaced bell crank 73, the conditions of FIGURE 4b prevail. Lever 73 is driven against portion 70a of the tone-arm positioning-control lever 70, tending to displace this lever in a clockwise direction about its pin 71 but at that instant lever 64 is still in the position shown in FIGURE 4a and lever 70, therefore, rests on top of lever 64. Later in the cycle, after movement of carriage 45 advances trigger 40 so that its projection 40a crosses over arm 82a of plate 82, lever 64 is displaced and frees lever 70 so that it now rotates about pin 71. This introduces stop projection 70c of the position-control lever into the path of lever 64 and restricts its return movement as required to cause tone arm 12 to be positioned over its pedestal 29.

Necessarily, automatic shut-off contemplates that the energizing circuit of the motor is disabled and this is accomplished at the same time the return movement of the tone arm is restricted. The usual on/off switch 89 has a switch actuator 80 which receives a pin 81 carried by a plate 82 which is part of the record reject assembly to be considered presently. Plate 82 is pivotally supported by a pin 83 and its displacement about that pin is effective to turn the changer on, turn it off, or reject the record by initiating a record-change cycle. One arm 82a of the plate extends across the path of trip lever 40. Normally, the plane of reject lever 40 is sufficiently removed from the plane of plate 82 that projection 40a of the trip lever does not engage extension 82a of the plate during an oscillation of carriage 45. This is the condition shown by the fragmentary view of FIGURE 4a.

When shut-off is to be accomplished in response to the movement of bell crank 73 by pressure-arm assembly 13, the displacement of bell crank 73 not only rotates position-control lever 70 about its pin 71 but also displaces trip lever 40 vertically upon a guide pin 85 as indicated in FIGURE 4b. It must be repeated that the representations of FIGURES 3 and 4 are views from underneath and it will be clear therefore that trip lever 40 normally rests upon pin 85 per force of its own weight but may be displaced as shown in FIGURE 4b by the operation of bell crank 73. When so displaced, projection 40a is positioned so that on the return movement of carriage 45 this projection engages arm 82a to rotate plate 82 clockwise and operate the on/off switch 15 to its off position.

*Record reject, manual and remote control*

Plate 82 functions not only to turn the record changer on and off but also to initiate a record-change cycle during the play of a record when it is desired that that record be rejected. The structure of the automatic reject mechanism is the subject of the aforementioned Galke et al. application. As shown in FIGURE 2, it includes a trigger lever 90 movable from a rest position in which it has no operative association with the record-change mechanism to a second position in which it effects actuation of trip lever 40. The trigger is pivoted about a pin 91 and is mechanically coupled to the record-change mechanism through a reject lever 93. Lever 93 doubles as the reject and as the on/off switch operator. It has one end captivated in a lever 94 secured to a pin or stub shaft 95 of reject control 14. As represented in FIGURE 2, lever 94 holds reject lever 93 in such a position that switch 89 is off. A spring 98 tends to maintain this condition. Manipulation of the control knob of the reject on/off adjustment 15 to turn lever 94 counter-clockwise about pin 95 displaces plate 82 in a counter-clockwise direction and adjusts the switch to its on condition. Further displacement of lever 94 in the same direction causes arm 82a to engage trip lever 40 and move it along its own length to the left as viewed in FIGURE 2 as required to initiate the change-cycle operation.

While adjustment knob 15 permits record reject and on/off to be controlled manually, the control may also be exercised remotely by means of a mechanical interconnection between trigger lever 90 and reject lever 93. This interconnection is afforded by a link 92 secured at one end to an extension of trip lever 90 and at the opposite end to a pin carried on lever 94. The end of link 92 coupled to lever 94 is formed into a hook which permits sufficient lost motion between these elements that manual operation of switch 89 is possible. Spring 88 coiled about pivot 91 biases trigger 90 in a clockwise direction but movement of the trigger is normally impeded by a latch 100 pivotally mounted to a support 101 upon a relay 102 and urged into locking engagement with trigger 90 by a bias spring 103. Latch 100 is the displaceable armature of relay 102 so that energization of the relay withdraws the latch from locking engagement with trigger 90, releasing the trigger to the influence of spring 91 as required to actuate trip lever 93 from either off or on positions into record reject position.

It is desired that relay 102 be permitted to respond only to control signals received during quiescent conditions of the record-change mechanism. The expression "quiescent condition" is intended to mean the condition in which the record-change mechanism is not executing a record-change cycle. To that end there is a switch 104 connected in circuit with relay 102 and maintained closed by a bifurcated termination 51 of carriage 45 only during the quiescent or at rest position of the carriage. Once the carriage starts its oscillation during a record-change cycle, switch 104 opens and relay 102 cannot be energized until that switch has been reclosed.

After trigger 90 has been released to initiate a record-change cycle, it is necessary that it be reset and this is accomplished by reset arm 105 carried on carriage 45 and movable along a path which intercepts a cam portion 106 constructed on trigger 90. After the trigger has been released and a record-change cycle has been initiated, clockwise rotation of single cycle gear 41 causes reset arm 105 to engage cam 106 and turn trigger 90 to the position represented in FIGURE 2, permitting latch 100 to resume its locking position with the trigger.

There is a mechanical interconnection between the reject mechanism and the driving system for the turntable comprising a link 110 anchored at one end to lever 94 and at the other to a lever 111 which carries a stub shaft on which are supported both the drive wheel which engages the driving shaft of motor 16 and pulley 19 which engages depending flange 18 of the turntable to complete the driving connection from the motor to the turntable. Lever 111 is pivotally mounted on a lever 113 which in turn is pivoted on a pin 114. A spring 115 biases lever 111 clockwise. In all positions other than the off position of lever 94, spring 115 is permitted to establish a driving connection from the shaft of motor 16 through pulley 19 to flange 18 of the turntable. When lever 94 is adjusted as shown in FIGURE 2 to establish switch 89 in its off condition, link 110 draws lever 111 in a counter-clockwise direction and displaces the pulleys both from the drive shaft of motor 16 and the flange of turntable 17. This is desirable because it avoids developing flats on the pulleys which otherwise are encountered if the pulleys are permitted to remain in stationary contact with the motor shaft or turntable flange for any extended period of time.

All of the mechanism as thus far described is the conventional record-changing mechanism plus the remotely actuated record reject of the Galke et al. application. The present invention adds to this mechanism the provision for simulated shut-off and avoidance of the lost record. These additional functions will now be considered.

*Simulated shut-off*

A condition which is characteristic of the play of the last record and which is required to effect shut-off of the changer in the next succeeding cycle of the change mechanism may be established through a mechanism which simulates the operation of bell crank 73 by pressure-arm assembly 13. The means for simulating this operating condition is clearly illustrated in FIGURE 3 and comprises a bell crank 120 pivotally supported on a mounting bracket 121 secured to the base plate of the instrument. Bell crank 120 pivots about a pin 122. One arm of bell crank 120 is provided with an actuator 120*a* which may be displaced about a path which brings the actuator into contact with bell crank 73 to move the bell crank and, through it, move control-arm positioning lever 70. Actuator 120*a*, however, is normally retained in a position where it is free of bell crank 73 and, therefore, has no effect on the operation of the latter. It is held in this rest position by a latch 123 pivotally supported on bracket 121 and biased into latching engagement with bell crank 120 by a spring 124. A spring 125 biases bell crank 120 in a direction to cause actuator 120*a* to engage and actuate bell crank 73 from which it will be understood that actuator 120*a* comprises means for simulating in the changer that condition which is characteristic of the play of the last record since, as explained above, during the play of the last record pressure-arm assembly 13 actuates bell crank 73 in precisely the same way as the bell crank is actuated by displacement of member 120*a* under the force of spring 125. The displacement of actuator 120*a* into engagement with bell crank 73 is dependent only upon the release of latch 123 and is, therefore, independent of the discharge of records from the storage magazine of spindle 20. The latch may be released, permitting spring 125 to displace actuator 120*a*, by energization of a relay 130 which attracts latch 123 as an armature.

Once actuator 120 has been permitted to simulate conditions characteristic of shut-off, it is necessary that it be subsequently reset or restored to its normal position and this is accomplished by a pin 131 positioned on carriage 45. Since the switch actuator arm 82*a* of plate 82 is effective to operate the shut-off switch 89 only upon the return stroke of carriage 45, it is necessary that the reset of lever 120 be likewise delayed until the return travel of the carriage. For that reason, the reset is under the control of a lever 132 which is pivoted on bell crank 120 and urged in a counter-clockwise direction by a spring 133. Its movement in that direction is limited by a stop projection 134 which may engage bell crank 120.

On the forward movement of carriage 45, movement to the right as viewed in FIGURE 3, pin 131 rotates lever 132 clockwise against spring 133 and merely slips past it but on the return travel of the carriage pin 131 engages lever 132 and, since stub projection 134 precludes counter-clockwise rotation of lever 132 on bell crank 120, the bell crank is returned by pin 131 to its normal position, camming over the restraining notch of latch 123 and locking itself in its rest position through the latch. Projection 135 of bracket 121 is another limit stop which restricts the clockwise rotation of bell crank 120 when it is released from latch 123.

*Lost record prevention*

Since the shut-off is accomplished through the cycle of the record-change mechanism, the record-feed machanism operates ejector 23 of the spindle to feed a record even during a change cycle occasioned by simulated shut-off. This may be undesirable because it provokes the so-called lost record and is avoided by means for disabling the record-feed mechanism during the change cycle following the establishment of a simulated condition leading to shut-off. This means is actuated concurrently with actuator 120*a* and comprises a lever 140 pivoted about a pin 141 as shown in FIGURE 3. The lever has one arm 140*a* which extends to a position adjacent latch 123, presenting its free end to a depending abutment 120*b* of bell crank 120. Another arm 140*b* of lever 140 extends in the opposite direction to present a terminal portion 140*c*, which is clearly shown in FIGURE 2, into engagement with one of the arms of the saddle-shaped record-feed actuating member 26. If lever 140 is permitted to pivot in a counter-clockwise direction about pin 141 as viewed in FIGURE 3, actuating lever 26 which normally effects coupling of the record-feed mechanism to the record-change cycling mechanism is displaced into an inactive position in which the record-feed mechanism is effectively disassociated from the record-change mechanism. More particularly, displacement of lever 140 causes member 26 to be axially displaced upon stub shaft 27 in a direction to retract its projecting portion **26*a* from the path of travel of projection 50 of carriage 45 which otherwise actuates lever 26** to effect the feed of a record during each cycle of the record-change mechanism.

With arm **140*a* of pivoted lever presented to projection 120*b* of bell crank 120, the release of latch 123 not only occasions displacement of actuator 120*a* but also pivotal movement of lever 140 against the bias of spring 53. This follows because of the force of bell crank 120 directed against lever 140*a* through its depending projection 120*b*. As bell crank 120 is restored to its normal or inactive position, spring 53 returns lever 140** to the position shown in FIGURE 3 to recondition the mechanical interconnection of the record-feed mechanism with the change-cycle mechanism.

*Remote control of shut-off*

The need for simulated shut-off arises where the record changer is a part of a larger instrument that may include a television as well as a radio receiver with a selector mechanism to permit selective operation of the changer or either receiver. A desire to switch from one instrument to the other may, of course, take place during the play of a record and a control arrangement is provided to permit the execution of this choice. A suitable such arrangement is represented in FIGURE 5. It comprises a control chassis or remote amplifier 150 serving as the receiver portion of a supersonically operated remote control system of the type that is described and claimed in Adler Patent 2,817,025, issued on December 17, 1957 and assigned to the assignee of the present invention.

It has a microphone 151 which may accept command signals originating at a remote point for utilization by the control chassis. In order easily to accommodate different functions and to select any function for accomplishment under the control of a remotely located signal transmitter, the control chassis is frequency selective. So far as the control of the record changer described above is concerned, it is only necessary to consider two frequency responsive and selective outputs of control chassis 150; one which responds to a command signal of a particular frequency to energize the record reject mechanism and another which responds to a command signal of a distinctly different frequency for accomplishing shut-off.

Such signals may be generated in a transmitter 152 to be held and operated by the user. It may be a mechanical resonator featuring a longitudinal-mode vibrator such as an aluminum rod which, when stimulated by being struck with a hammer or the like, issues a signal having a frequency determined by the physical length of the rod. Where there are only two functions of particular concern, as with the case at hand, the transmitter need have only two such rods although usually it will have more so that more than two functions may be readily controlled from a remote point. A signal of one command frequency, after selection and amplification by control chassis 150, may energize reject relay 153. A signal of the other command frequency received and amplified by control chassis 150 may energize selector relay 154.

Energization of relay 154 completes an obvious circuit for a stepping motor 155 which rotates a driven shaft 156 by 90° in response to each actuation of the relay. A switch 156′ closes early in the operation of motor 155 to complete a holding circuit which makes sure that a complete step is accomplished even though the duration of the command signal, which energizes relay 154, is less than the time required for one step of the motor shaft.

A number of ganged rotating switch contacts are driven from motor shaft 156 so that programming or selection takes place in response to energization of relay 154 but the representation of FIGURE 5 is largely restricted to only so much of the program device as pertains to the record changer. Switch element 157 of the programming device has three contacts which may lead respectively to the television receiver, to the radio receiver, and to the phonograph or record changer amplifier circuitry of the entertainment device. The particular one of these three instruments which is instantaneously conditioned for operation is that which is connected to the stationary contact to which the motor driven rotary contact 158 is positioned. It is apparent from the drawing that only so much of the circuit is represented as indicates the connection of the 110 volt supply of the program switch to a selected instrument. The remaining circuitry will be apparent to those skilled in the art and is of no particularly moment to the present description. The remaining stationary elements of the program selector 159, 160 and 161 connect with and control the reject and simulated shut-off relays 102 and 130 of the record changer.

With the program selector in the position shown, conditioning the record changer for operation, a circuit may be completed upon the energization of relay 153 which extends from the power supply, through closed contacts on stationary element 159 and a transformer 162 to the other side of the power supply. Current flow through that circuit induces a pulse current to effect operation of the reject relay 102. Operation of that relay, as explained in the Galke et al. application, actuates switch 89, the on/off switch of the record changer and completes an obvious energizing circuit for phonograph motor 16. The circuit for simulated shut-off relay 130 is interrupted at stationary element 161 of the selector.

*Operation*

In considering the operation of the described arrangement, it will be assumed that hand transmitter 152 has issued command signals to actuate selector 154 and establish the program selector to the condition represented in FIGURE 5.

If a series of records have been stored on the magazine section of spindle 20, the first record may be played by actuating remote transmitter 152 to cause it to issue a command signal of the frequency to which record reject is assigned. The receipt of that signal by control chassis 150 energizes relay 153 which results in the actuation of reject relay 102. As explained in the Galke et al. application, energization of relay 102 closes on/off switch 89 and initiates the change cycle which feeds the first record to the turntable for playing. The records stored in the magazines are then played sequentially in the usual manner until the last record has been played. At the start of the play of the last record, pressure-arm assembly 13 actuates bell crank 73 to establish the condition represented in FIGURE 4*b* preparatory to shutting off the record changer. At the completion of the change cycle following the play of the last record, stop abutment **70*c* restrains the return movement of the tone arm so that it pauses over pedestal 29 and then descends to the pedestal of the conclusion of the change cycle. Additionally, displacement of bell crank 73 and position stop 70*c*** as shown in FIGURE 4*b* displaces trip lever 40 so that at the conclusion of that change cycle arm **82*a* of switch plate 82 is engaged and the switch plate rotated to actuate switch 89** and turn the record changer off.

One may desire to switch from the operation of the record changer to the radio or television receiver before all of the stored records have been played and this may be done by operating remote transmitter 152 to cause energization of selector relay 154. That relay causes motor 155 to step the program device 90° and in so doing de-energize the associated phonograph circuitry at stationary element 157 of the selector. At the same time, the movement of the rotating contact of element 160 from the stationary contact shown to the next succeeding one causes a pulse of current to traverse transformer 162. Simultaneously, the rotating contact of element 161 is displaced to a succeeding contact. As a consequence, relay 102 of the reject mechanism is actuated to initiate a change cycle and relay 130 of the simulated shut-off is likewise actuated, via element 161, causing the release of bell crank 120 by withdrawing latch 123 from its locking engagement with extension **120*b***.

With bell crank 120 released, spring 125 rotates the bell crank in a clockwise direction and actuates bell crank 73 simulating the shut-off condition. Concurrently, lever 140 is displaced in a counter-clockwise direction to withdraw extension **26*a* from the path of projection 50 on carriage 45. The carriage executes one complete oscillation but its forward movement is now ineffective to feed a record since the interconnection of the change cycle mechanism with the record-feed mechanism has been effectively interrupted by removal of element 26*a* from the path of travel of projection 50. In the remainder of that cycle of carriage 45, shut-off is accomplished by the actuation of plate 82 which moves the operator of switch 89 to the off position. Additionally, the tone arm is positioned to be returned to its rest or pedestal 29 and at the conclusion of the record-change cycle, pin 131 resets actuator 120*a* by restoring bell crank 120 to its locking relation with latch 123. At the same time spring 53 restores lever 140 to its normal position, again placing element 26*a* in the path of projection 50 of the carriage. Thus, the arrangement has been completely reconditioned and may be operated again as desired. Of course, switch 89 is now opened and motor 16 is de-energized and therefore to replay the record changer, it is necessary first to adjust the selector and then energize relay 153 to operate the reject mechanism which again closes on/off switch 89**.

The described system has very attractive features for an entertainment device that includes a television receiver, a radio receiver and a record changer. It is a convenient arrangement for operating the record changer from a remote point and for shutting off the record changer when one desires to use the radio or television receiver. When the shut-off is accomplished, whether that be by play of the last record of a stack or by the simulated shut-off condition, the circuits of the changer are de-energized and the driving connection from motor 16 to the turntable is interrupted. The pulleys that otherwise establish the driving connection are freed of the surfaces that they engage and thus the tendency to develop flats on the pulleys is obviated. Also, the lost-record phenomenon described above is prevented through the expedient of effectively disabling the record-feed mechanism in the change cycle which next succeeds the condition of simulated shut-off.

While a particular embodiment of the invention has been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A recorder changer comprising: a record-change cycling mechanism; a record-feed mechanism coupled to and actuated by said change mechanism for feeding records from a magazine into playing position; a shut-off mechanism, responsive to the operation of said change mechanism following the play of the last record in said magazine, for shutting off said changer; means for simulating in said changer an operating condition which is characteristic of the play of said last record to effect shut-off of said changer in the next succeeding cycle of said change mechanism; and means responsive to said simulating means for disabling said record-feed mechanism in said next succeeding cycle of said change mechanism.

2. A record changer comprising: a record-change cycling mechansim; a record-feed mechanism coupled to and actuated by said change mechanism for feeding records from a magazine into playing position; a shut-off mechanism, conditioned for operation by the discharge of the final record from said magazine and responsive to the operation of said change mechanism following the play of said final record, for shutting off said changer; means for conditioning said shut-off mechansim for operation independently of the discharge of any record from said magazine to simulate in said changer an operating condition which is characteristic of the play of said last record to effect shut-off of said changer in the next succeeding cycle of said change mechanism; and means responsive to said conditioning means for disabling said record-feed mechanism in said next succeding cycle of said change mechansm.

3. A record changer comprising: a record-change cycling mechanism; a record-feed mechanism coupled to and actuated by said change mechanism for feeding records from a magazine into playing position; a shut-off mechanism, conditioned for operation by the discharge of the final record from said magazine and responsive to the operation of said change mechnism following the play of said final record, for shutting off said changer; means for conditioning said shut-off mechanism for operation to simulate in said changer an operating condition whch is characteristic of the play of said last record to effect shut-off of said changer in the next succeeding cycle of said change mechanism; means independent of the records stored in said magazine for actuating said conditioning means; and means responsive to said conditioning means for disabling said record-feed mechanism in said next succeeding cycle of said change mechanism.

4. A record changer comprising: a record-change cycling mechanism; a record-feed mechanism coupled to and actuated by said change mechnism for feeding records from a magazine into playing position; a shut-off mechanism, conditioned for operation by the discharge of the final record from said magazine and responsive to the operation of said change mechanism following the play of said final record, for shutting off said changer; means for conditioning said shut-off mechanism for operation to simulate in said changer an operating condition which is characteristic of the play of said last record to effect shut-off of said changer in the next succeeding cycle of said change mechanism; means for normally retaining said conditioning means in an inoperative state but effective, independent of the records stored in said magazines for actuating said conditioning means; means responsive to said conditioning means for disabling said record-feed mechanism in said next succeeding cycle of said change mechansm; and a reset mechanism actuated by said change mechanism for restoring said conditioning means to its aforesaid inoperative state during said next succeedng cycle of said change mechanism.

5. A record changer comprising: a record-change cycling mechanism; a record-feed mechanism having an actuating lever normally operatively associated with said change mechanism to effect feeding of records from a magazine into playing position but displaceable into an inactive position in which said feed mechanism is disassociated from said change mechanism; a shut-off mechanism, responsive to the operation of said change mechanism following the play of the last record in said magazine, for shutting off said changer; means for simulating in said changer an operating condition which is characteristic of the play of said last record to effect shut-off of said changer in the next succeeding cycle of said change mechanism; and means responsive to said simulating means for displacing said actuating lever of said feed mechanism to its aforesaid inactive position in said next succeeding cycle of said change mechanism.

6. In an entertainment device including a record changer, a wave-signal receiver and a selector for permitting selective operation of said changer or said receiver, said record-changer comprising: a record-change cycling mechanism; a record-feed mechanism coupled to and actuated by said change mechanism for feeding records from a magazine into playing position; a shut-off mechanism, responsive to the operation of said change mechanism following the play of the last record in said magazine, for shutting off said changer; means for simulating in said changer an operating condition which is characteristic of the play of said last record to effect shut-off of said changer in the next succeding cycle of said change mechanism; means, responsive to the operation of said selector in selecting from said record changer to said receiver, for actuating said simulating means; and means responsive to said simulating means for disabling said record-feed mechanism in said next succeeding cycle of said change mechanism.

7. A record changer comprising: a record-change cycling mechanism; a record-feed mechanism coupled to and actuated by said change mechanism for feeding records from a magazine into playing position; a shut-off mechanism, conditioned for operation by the dischrage of the final record from said magazine and responsive to the operation of said change mechanism following the play of said final record, for shutting off said changer at the conclusion of a record-change cycle; means for conditioning said shut-off mechanism for operation to simulate in said changer an operating condition which is characteristic of the play of said last record to effect shut-off of said changer in the next succeeding cycle of said change mechanism; means for normally retaining said conditioning means in an inoperative state but effective, independent of the records stored in said magazine for actuating said conditioning means; means responsive to said conditioning means for disabling said record-feed mechanism in said next succeeding cycle of said change mechanism; and a reset mechanism actuated by said change mechanism for restoring said conditioning means to its aforesaid inoperative state before the completion of the shut off function in said next succeding cycle of said change mechanism.

8. A record changer comprising: a record-change cycling mechanism; a record-feed mechanism coupled to and actuated by said change mechanism for feeding records from a magazine into playing position; a shut-off mechanism, responsive to the operation of said change mechanism following the play of the last record in said magazine, for shutting off said changer; means for conditioning said shut-off mechanism for operation independently of the discharge of any record from said magazine to simulate in said changer an operating condition which is characteristic of the play of said last record to effect shut-off of said changer in the next succeeding cycle of said change mechanism.

9. A record changer comprising: a record-change cycling mechanism; a record-feed mechanism coupled to and actuated by said change mechanism for feeding records from a magazine into playing position; a shut-off mechanism, responsive to the operation of said change mechanism following the play of the last record in said magazine, for shutting off said changer; means for simulating in said changer an operating condition which is characteristic of the play of said last record to effect shut-off to said changer in the next succeeding cycle of said change mechanism; said means actuated concurrently with said simulating means for disabling said record-feed mechanism in said next succeeding cycle of said change mechanism.

10. A record changer comprising: a record-change cycling mechanism; a record-feed mechanism coupled to and actuated by said change mechanism for feeding records from a magazine into playing position; a shut-off mechanism, conditioned for operation by the discharge of the final record from said magazine and responsive to the operation of said change mechanism following the play of said final record, for shutting off said changer; means for conditioning said shut-off mechanism for operation to simulate in said changer an operating condition which is characteristic of the play of said last record to effect shut-off of said changer in the next succeeding cycle of said change mechanism; means responsive to a control signal received from a remote point for actuating said conditioning means; and means responsive to said conditioning means for disabling said record-feed mechanism in said next succeeding cycle of said change mechanism.

References Cited by the Examiner

UNITED STATES PATENTS

| | | | |
|---|---|---|---|
| 2,378,086 | 6/1945 | Johnson | 274—10 |
| 2,595,125 | 4/1952 | Carson | 274—10 |
| 2,707,639 | 5/1955 | Vistain | 274—10 |
| 2,783,049 | 2/1957 | Kunz | 274—10 |
| 2,868,545 | 1/1959 | Vistain | 274—10 |

NORTON ANSHER, *Primary Examiner.*

NEWTON N. LOVEWELL, ELI J. SAX, EMIL G. ANDERSON, *Examiners.*